3,502,641
PROCESS FOR CROSSLINKING POLYETHYLENE
John D. Harrison, 3853 Grove Court, Palo Alto, Calif.
94303, and Don E. Harrison, 2818 Orlando Place,
Pittsburgh, Pa. 15235
Filed Sept. 3, 1968, Ser. No. 756,987
Int. Cl. C08d 3/04
U.S. Cl. 260—94.9                    2 Claims

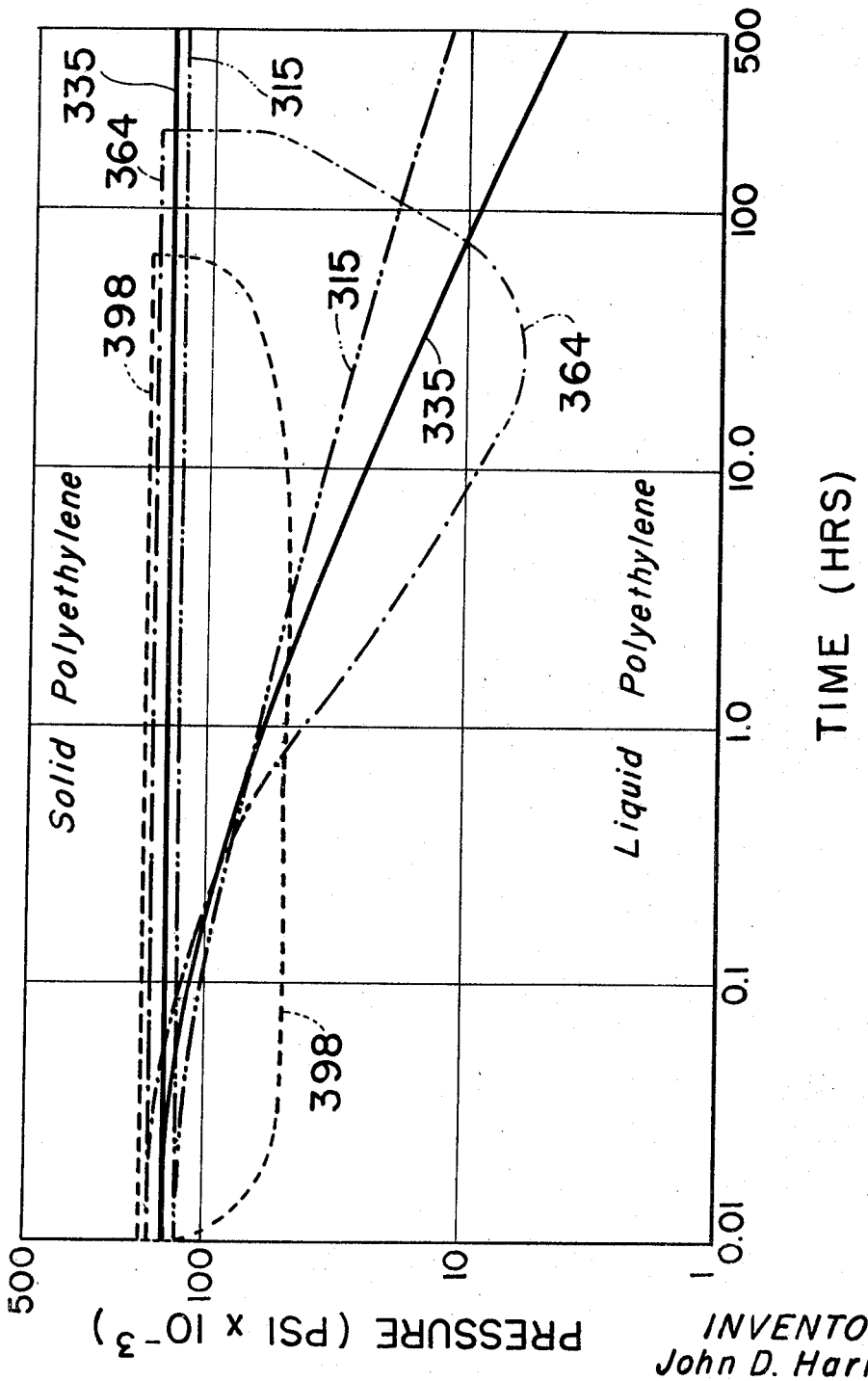

ABSTRACT OF THE DISCLOSURE

A process for randomly crosslinking polyethylene by subjecting liquid polyethylene simultaneously to both heat and pressure, the temperature being above 250° C. and below 450° C. and the pressure being from $5(10)^3$ to $10(10)^4$ p.s.i.

---

This invention relates to a method for randomly crosslinking polyethylene, and, more particularly, to a method in which liquid polyethylene is simultaneously subjected to both heat and pressure.

Polyethylene is a widely used thermoplastic. Solid polyethylene has physical characteristics that vary from that of a wax to that of a strong resin depending upon its molecular weight, crystallinity, spherulite size, and degree of branching. Liquid polyethylene has a viscosity that is dependent upon both the molecular weight and degree of branching.

Random crosslinking modifies polyethylene such that above the crystalline melting point it is an elastomer rather than a liquid. This change extends the useful application range of the polymer to temperatures above the crystalline melting point of 142° C. Furthermore, random crosslinking imparts the important property of "heat recoverability" or "plastic memory" to polyethylene. The crosslinked polymer can be molded into any desired shape above the crystalline melting point and will maintain that shape if cooled below the crystalline melting point while held in that shape. However, when the polymer is again heated to temperatures above the crystalline melting point, it will return to its original shape. This property has been useful in many products, such as heat shrinkable tubing used in electrical insulation. Other valuable properties are imparted to polyethylene by random crosslinking including greater resistance to dissolution by common solvents and to stress cracking.

There are three known processes by which polyethylene can be crosslinked. These are (1) chemical curing, for example, curing with organic peroxides, azides, and sulphur, (2) ionizing radiation, and (3) ultraviolet radiation plus a photoactive agent, such as benzophenone.

In the chemical curing process an agent that is active at the molding temperatures is blended with the polymer. This is generally carried out in a two-step operation since crosslinking occurs at a slower rate than molding and crosslinking can be accelerated by utilizing temperatures higher than those required for the molding process. However, the operation is complicated because a partially crosslinked polymer is very fragile at temperatures above its crystalline melting point. Chemical crosslinking also has the disadvantage that bubble formation is encountered which, among other things, can lead to premature electrical breakdown, and that residues are left from the curing agent, which, when undecomposed, can cause an early degradation of the polymer.

Crosslinking of polyethylene in either the liquid or solid state can be effected by ionizing radiation, such as with cobalt 60 or with an electron accelerator. However, the results are not entirely satisfactory since a uniform degree of crosslinking is difficult to obtain, particularly in objects having complicated cross-sections of varying thicknesses. Moreover, undesirable side effects accompany irradiation by high energy particles, for example, degradation of the polymer.

Ultraviolet radiation absorbed by photoactive agents, such as benzophenone will produce crosslinking in polyethylene. However, it is difficult to achieve uniform crosslinking in objects having cross-sections of nonuniform thicknesses. In ultraviolet radiation, crosslinking progresses from the surface inward at a rate governed by the U.V.+photoactive agent crosslinking reaction; hence, curing is diffusion limited. Further, residues left from the photoactive agents can cause premature degradation of the polymer similar to those found in chemical curing.

We have invented a novel method of crosslinking polyethylene that overcomes the disadvantages of the prior processes. We have found that polyethylene can be reproducibly crosslinked by subjecting the polyethylene to a particular range of temperature and pressure. Basically, we have found that random crosslinking will occur in polyethylene when the latter is simultaneously subjected to temperatures above 250° C. to below 450° C. while under pressures between $5(10)^3$ to $10(10)^4$ p.s.i. The time required for crosslinking is dependent on both temperature and pressure. For example, at 315° C. and 20,000 p.s.i., polyethylene will crosslink in 75 hours. If the temperature is raised to 335° C., polyethylene will crosslink in 15 hours. If the pressure is raised to 70,000 p.s.i., polyethylene will crosslink in less than an hour at either temperature.

On the attached drawing we have shown by means of isotherms, the combinations of pressure, temperature, and time at which crosslinking will occur.

In the drawing the ordinate represents the pressure in pounds per square inch and the abscissa represents time in hours. Both are plotted on a logarithmic scale. At a pressure of 120,000 p.s.i. and a temperature of 307° C. and increasing progressively to 180,000 p.s.i. and 390° C., polyethylene is a solid and no crosslinking can occur. At pressures below approximately 5,000 p.s.i., no crosslinking occurs. Furthermore, if polyethylene is held at a temperature and pressure for long periods of time, degradation of the polyethylene occurs. This is particularly dangerous as the temperature is increased. For example, at 80,000 p.s.i. degradation occurs at 364° C. after 120 hours and at 398° C. after only 50 hours. The high temperature and high pressure range are of most interest since crosslinking will occur readily rapidly under those conditions. We prefer to operate at pressures of 50,000 to 80,000 p.s.i. and at temperatures of 315° C. to 400° C.

In the table we have set forth the times required for crosslinking to occur in polyethylene held at various temperatures and pressures.

TABLE

| Pressure (p.s.i.) | Temperature (° C.) | | | | | |
|---|---|---|---|---|---|---|
| | 250 | 315 (hrs.) | 335 (hrs.) | 364 (hrs.) | 398 (hrs.) | 450 |
| 5,000 | ∞ | >1,000 | ∞ | ∞ | ∞ | d |
| 10,000 | ∞ | ~1,000 | 75 | 8<x<64 | ∞ | d |
| 20,000 | ∞ | 75 | 15 | 2.6<x<100 | ∞ | d |
| 30,000 | ∞ | 16 | 5.6 | 1.4<x<107 | ∞ | d |
| 40,000 | ∞ | 6 | 2.9 | 1<x<116 | ∞ | d |
| 50,000 | ∞ | 2.5 | 1.7 | 0.78<x<118 | 0.03<x<6 | d |
| 60,000 | ∞ | 1.1 | 1.1 | 0.60<x<119 | 0.02<x<30 | d |
| 70,000 | ∞ | 0.54 | 0.68 | 0.43<x<120 | 0.015<x<40 | d |
| 80,000 | ∞ | 0.25 | 0.42 | 0.34<x<120 | 0.013<x<50 | d | d = degradation.

The data are based on actual test data on various commercially available polyethylenes. The degree of crosslinking was estimated by measuring the increase in weight that occurred after the polyethylene had been immersed in decahydronaphthalene at 135° C. The more extensive the crosslinking, the lower the weight swelling ratio. We obtained weight swelling ratios from 1.4 to 29.7 times the original weight by pressure-temperature crosslinking. We have found that low density polyethylene resins crosslinked more extensively, gave more flexible and transparent products than did the high density resins subjected to our method.

Any common polyethylene can be crosslinked by our process. We have had success with the following commercial polyethylene resins: Phillips Marlex 50, 5002, 5003, 5005, 5012, 5040, 5065, 6002, 6009, 6035, 6050, TR-915, TR-916, TR-925, TR-950, and TR-95; Union Carbide DPD 7366NT Blend ET3351; and Allied Chemical waxes 200 and 400.

The principal advantage of our process is that crosslinking progresses uniformly throughout the volume of the liquid polyethylene. In the temperature range of the process, the relatively low viscosity of polyethylene permits injection into a mold for pressurization. Since pressure is transmitted equally throughout the liquid, complex shapes can be uniformly crosslinked into bubble-free products. The blending operations required in the other processes are, therefore, eliminated which eliminates the undesirable side effects. It would be possible to mold and crosslink the polymer in one instantaneous step, for example, the mold and polymer could be heated to approximately 398° C. and with a $6(10)^4$ p.s.i. applied, crosslinking would be instantaneous.

EXAMPLE

A thin-walled copper tube was filled with liquid polyethylene and the ends were cold sealed with an hydraulic pinch-off tool. The sealed tube was inserted into a high-pressure bomb and heated to the desired temperature, and then pressurized with argon. After holding the sample for a specified time, it was depressurized, cooled and tested for crosslinking by swelling in decahydronaphthalene at 135° C. Marlex 50 was sealed in a copper tube under vacuum and pressurized to 62,700 p.s.i. at 315° C. for four hours. The resulting product had a weight swelling ratio of 2.2. Marlex was pressurized to 50,500 p.s.i. at 398° C. for one hour, the product had a weight swelling ratio of 14.6. Sealing the tubes in air or in a vacuum of $10^{-4}$ torr produced no marked differences in the crosslinked product.

While we have described the present preferred embodiments of our invention, it is to be understood that it may be otherwise embodied within the scope of the appended claims.

We claim:
1. A process for randomly crosslinking polyethylene comprising:
    (A) heating said polyethylene to a temperature above 250° C. and below 450° C.; and
    (B) simultaneously subjecting said polyethylene to a pressure from $5(10)^3$ to $10(10)^4$ p.s.i.
2. A process as set forth in claim 1 wherein the temperature, pressure, and time for crosslinking are within the area defined by the isotherms in the accompanying drawing.

References Cited
UNITED STATES PATENTS 3,412,080 11/1968 Smith et al. _____ 260—94.9
3,414,498 12/1968 Shinohara et al. ___ 204—159.13

JOSEPH L. SCHOFER, Primary Examiner

R. A. GAITHER, Assistant Examiner

UNITED STATES PATENT OFFICE
CERTIFICATE OF CORRECTION

Patent No. 3,502,641     Dated   March 24, 1970

Inventor(s)   John D. Harrison and Don E. Harrison

It is certified that error appears in the above-identified patent and that said Letters Patent are hereby corrected as shown below:

In Table I, delete "(hrs.)" after the numbers 315, 335, 364 and 398. In Table 1, after "1,000" (first occurrence) insert --hrs--. In the fourth column of Table I, after "75" insert --hrs--. In the fifth column of Table I, after "64" insert --hrs--. In the sixth column of Table I, after "6" insert --hrs--.

Signed and sealed this 11th day of August 1970.

(SEAL)
Attest:

EDWARD M. FLETCHER, JR.          WILLIAM E. SCHUYLER, JR.
Attesting Officer                Commissioner of Patents